United States Patent [19]

Fjeldsted

[11] 4,427,259

[45] Jan. 24, 1984

[54] SELECTABLE FIELD-OF-VIEW INFRARED LENS

[75] Inventor: Thomas P. Fjeldsted, West Covina, Calif.

[73] Assignee: Rockwell International Corporation, El Segundo, Calif.

[21] Appl. No.: 410,789

[22] Filed: Aug. 23, 1982

[51] Int. Cl.³ .............................................. G02B 13/14
[52] U.S. Cl. ..................................... 350/1.3; 350/453
[58] Field of Search ................... 350/1.2, 1.3, 1.4, 453

[56] References Cited

FOREIGN PATENT DOCUMENTS 1088382 10/1967 United Kingdom ................ 350/1.2

Primary Examiner—Bruce Y. Arnold
Assistant Examiner—William Propp
Attorney, Agent, or Firm—H. Fredrick Hamann; Daniel R. McGlynn; James F. Kirk

[57] ABSTRACT

A selectable field-of-view infrared lens is disclosed for projecting an image from object space onto a flat image plane, the selectable field-of-view infrared lens being corrected over the spectral region of 3.3 to 4.2 microns and having a selectable wide field-of-view comprising: an objective lens system having a plurality of lens elements formed of material optically transparent over the spectral region of 3.3 to 4.2 microns; a selectable refractive Galilean afocal telescope having a plurality of lens elements formed of material optically transparent over the spectral region of 3.3 to 4.2 microns, the telescope being coupled to the objective lens in select field-of-view determining relation with the objective lens whereby, upon selection, the selectable refractive Galilean afocal telescope cooperates with the objective lens system to provide a wide field-of-view; a means for scanning, the means scanning having an optical element interposed between and coaxially aligned with the selectable refractive Galilean afocal telescope and the objective lens system, the means for scanning being adapted to oscillate the optical the optical element through a predetermined angle thereby, angularly displacing the collimated rays whereby, upon selection, the selectable refractive Galilean afocal telescope receives collimated light from object space and provides the collimated rays to the means for scanning optical element, the collimated rays passing through the oscillating optical element and being reciprocally displaced, the reciprocally displaced collimated rays passing to the objective lens system, the objective lens system focusing the reciprocally displaced collimated rays on the flat image plane; thereby, forming a reciprocally displaced image.

8 Claims, 1 Drawing Figure

SELECTABLE FIELD-OF-VIEW INFRARED LENS

BACKGROUND OF THE INVENTION

1. Field of the Invention

This invention relates to objective lens systems having multiple lenses of crystalline semiconductor materials such as silicon and germanium. The invention lens is particularly adapted for use in light weight portable FLIR (Forward Looking Infrared) surveillance systems. 2. Description of the Prior Art Single field-of-view, four-element infrared objective lens systems find particular application in scanning infrared systems. These systems typically employ a detector upon which an image is focussed by the invention lens system. The detector used is typically flat. Prior art lens designs are best suited for projecting an image on a curved field of curvature. The present selectable field-of-view infrared objective lens is designed to provide a narrow or a wide field-of-view, to minimize narcissus on the detector, and form a flat field of curvature.

Infrared objective lens systems, used to project an image through a cold stop onto a flat detector to form an image plane in a cryogenically cooled space, have the problem of re-imaging the detector onto itself. The mirror image of itself is due to reflections from the surfaces of lenses within the objective lens system. The image of the detector when sensed by the detector along with the intended image results in a loss of resolution. Re-imaging of the detector onto the detector by the infrared lens is an effect referred to as narcissus. The invention selectable field-of-view infrared objective lens is designed to provide alternative fields-of-view and effectively minimize the effect of narcissus while maintaining a flat field of curvature.

An application for U.S. Patent entitled "Selectable Field-of-View Infrared Lens", Ser. No. 293,763, was filed on Aug. 17, 1981 by the same inventor. This application discloses a reflective afocal telescope coupled to an objective lens system. The reflective afocal telescope uses mirrors not included in the present invention.

SUMMARY OF THE INVENTION

It is a major objective of this invention to provide an infrared objective lens having a selectable field-of-view.

Another major objective of this invention is to reduce the loss of resolution that accompanies the field curvature produced by projecting an image onto a flat detector.

Another particular objective of this invention is to minimize the effect of narcissus. It is a highly particular objective of this invention to produce a three element infrared objective having an f/1.5 speed, corrected over the spectral region of 3.3 to 4.2 microns and a wide and narrow field-of-view.

These and other objectives of the invention are realized in a three element infrared objective lens having an objective lens system having a plurality of lens elements, the plurality of lens elements being coaxially aligned and adapted to receive light from object space and to form an image on a flat image plane. A selectable refractive Galilean afocal telescope is included and is coupled to the objective lens in select field-of-view determining relation with the objective lens system; whereby, upon selection, the selectable refractive Galilean afocal telescope cooperates with the objective lens system to provide a wide field-of-view. A means for scanning having an optical element with an optical center is interposed between and coaxially aligned with the selectable refractive Galilean afocal telescope and the objective lens system. The means for scanning is adapted to oscillate the optical element through a predetermined angle, angularly displacing the collimated rays. Upon selection, the selectable refractive Galilean afocal telescope receives collimated light from object space and provides the collimated rays to the scanning optical element, the collimated rays pass through the scanning optical element and are reciprocally and angularly displaced. The collimated rays are reciprocally and angularly displaced as they pass through the objective lens. The objective lens system focuses the reciprocally and angularly displaced collimated rays on the flat image plane, thereby forming a reciprocally displaced image.

In a more particular alternative embodiment, the selectable field-of-view infrared lens further comprises: means for selectably coupling and decoupling the refractive Galilean afocal telescope from the objective lens system.

In yet a more particular alternative embodiment, the invention selectable field-of-view infrared lens further comprises a first lens, a second lens, a third lens with each respective lens having a front and back surface, and each respective surface having a respective radius of curvature. The selectable refractive Galilean afocal telescope first lens front surface has a radius $r_1$, a thickness $t_1$ and a back surface with a radius $r_2$. The selectable refractive Galilean afocal telescope second lens has a front surface with a radius $r_3$, a thickness $t_2$ and a back surface with a radius $r_4$. The first lens back surface and second lens front surface are separated by a distance $d_1$. The third lens has a front surface with a radius $r_5$, a thickness $t_3$ and a back surface with a radius $r_6$. The second lens back surface and third lens front surface are separated by distance $d_2$. In yet an even more particular alternative embodiment, the selectable field-of-view infrared lens means for scanning optical element further comprises: a front surface having a radius $r_7$, a thickness $t_4$ and a back surface having a radius $r_8$. The optical center of means for scanning optical element is spaced from the selectable refractive Galilean afocal telescope third lens back surface vertex by a distance $d_3$. The refractive Galilean afocal telescope chief ray is aligned to pass through the optical center of the means for scanning optical element, and is coaxially aligned with the objective lens system chief ray.

In a most particular alternative embodiment of the invention, selectable field-of-view infrared lens selectable refractive Galilean afocal telescope, the dimensions $r_1$, $r_2$, $r_3$, $r_4$, $r_5$, $r_6$, $d_1$, $d_2$, $t_1$, $t_2$ and $t_3$ are defined by the following table:

TABLE 1

| Lens Element | Radius of Curvature (inches) Front/Back | Thickness and Spacing (inches) | Aperture (inches) Front/Back | Material |
|---|---|---|---|---|
| 1 | $r_1 = +1.6210 \pm 0.001$ / $r_2 = +1.0141 \pm 0.001$ | $t_1 = 0.1250 \pm 0.002$ $d_1 = 2.1980 \pm 0.004$ | 0.8475/ 0.730 | SI |

TABLE I-continued

| Lens Element | Radius of Curvature (inches) Front/Back | Thickness and Spacing (inches) | Aperture (inches) Front/Back | Material |
|---|---|---|---|---|
| 2 | $r_3 = -2.3364 \pm 0.001$ / $r_4 = -2.9299 \pm 0.0015$ | $t_2 = 0.1250 \pm 0.001$ | 1.2135/ 1.2750 | GE |
| | | $d_2 = 0.1816 \pm 0.002$ | | |
| 3 | $r_5 = -2.9768 \pm 0.0015$ / $r_6 = -2.0206 \pm 0.001$ | $t_3 = 0.1250 \pm 0.001$ | 1.3594/ 1.3969 | SI | given the equivalent focal length, f, of said selectable refractive Galilean afocal telescope as being infinite, SI being Silicon and GE being Germanium. The magnification of the selectable refractive Galilean afocal telescope is approximately 0.32.

In yet another more particular alternative embodiment of the invention selectable field-of-view infrared lens, the means for scanning optical element is defined by the following table:

TABLE II

| Lens Element | Radius of Curvature Front/Back | Thickness and Spacing (inches) | Aperture (inches) Front/Back | Material |
|---|---|---|---|---|
| 4 | $r_7$ = INFINITE $r_8$ = INFINITE | $d_3 = 0.2500$ | 1.3446 1.3405 | SI |

SI being Silicon.

In another particular alternative preferred embodiment of the invention selectable field-of-view infrared lens, the objective lens system further comprises: a fifth lens element having a front and back surface and a thickness, $t_5$, the fifth lens element front surface having a radius of curvature $r_9$, and the fifth lens element back surface having a radius of curvature $r_{10}$. A sixth lens element is included having a front and back surface and a thickness $t_6$. The sixth lens element front surface has a radius of curvature $r_{11}$, and the sixth lens back surface has a radius of curvature $r_{12}$. A seventh lens element is included having a front and back surface and a thickness $t_7$. The seventh lens element front surface has a radius of curvature $r_{13}$, and the seventh lens element back surface has a radius of curvature $r_{14}$. A dewar window is included. The dewar window has a front surface and a back surface and a thickness $t_8$. The dewar window front surface has a radius of curvature $r_{15}$, and the back surface has a radius of curvature $r_{16}$.

The fifth lens element front surface vertex is spaced from the means for scanning oscillating optical element back surface by distance $d_4$. The sixth lens element front surface vertex is spaced from the fifth lens element back surface vertex by distance $d_5$. The seventh lens element front surface vertex is spaced from the sixth lens element back surface by distance $d_6$. The dewar window optical center is spaced from the seventh lens element back surface vertex by distance $d_7$. The flat image plane is spaced from the dewar window back surface by distance $d_8$.

In yet another even more particular preferred embodiment of the invention selectable field-of-view infrared lens, the objective lens system dimensions $r_9$, $r_{10}$, $r_{11}$, $r_{12}$, $r_{13}$, $r_{14}$, $r_{15}$, $d_4$, $d_5$, $d_6$, $d_7$, $d_8$, $t_5$, $t_6$, $t_7$ and $t_8$ are defined by the following table:

TABLE III

| Lens Element | Radius of Curvature (inches) Front/Back | Thickness and Spacing (inches) | Aperture (inches) Front/Back | Material |
|---|---|---|---|---|
| 1 | $r_9 = +2.4211 \pm 0.001$ / $r_{10} = +5.6848 \pm 0.001$ | $t_5 = 0.1182 \pm 0.002$ | 1.3307/ 1.3069 | SI |
| | | $d_5 = 0.0125 \pm 0.004$ | | |
| 2 | $r_{11} = +8.7545 \pm 0.001$ / $r_{12} = +5.0678 \pm 0.0015$ | $t_6 = 0.1500 \pm 0.001$ | 1.3074/ 1.2588 | GE |
| | | $d_6 = 1.9515 \pm 0.002$ | | |
| 3 | $r_{13} = +0.9334 \pm 0.0015$ / $r_{14} = +0.9742 \pm 0.001$ | $t_7 = 0.2500 \pm 0.001$ | 0.5495/ 0.4244 | SI |
| | | $d_7 = 0.0231$ | | |
| | $r_{15}$ = INFINITE $r_{16}$ = INFINITE | $t_8 = 0.0400$ $d_8 = 0.2000$ | | SA | given the equivalent focal length, f, of said objective lens system as being 1.804±0.01 inches, SI being Silicon, GE being Germanium and SA being Sapphire.

BRIEF DESCRIPTION OF THE DRAWINGS

The invention will be further described as to an illustrative embodiment thereof in conjunction with the attached drawing in which.

DESCRIPTION OF THE PREFERRED EMBODIMENT

Figure 1:
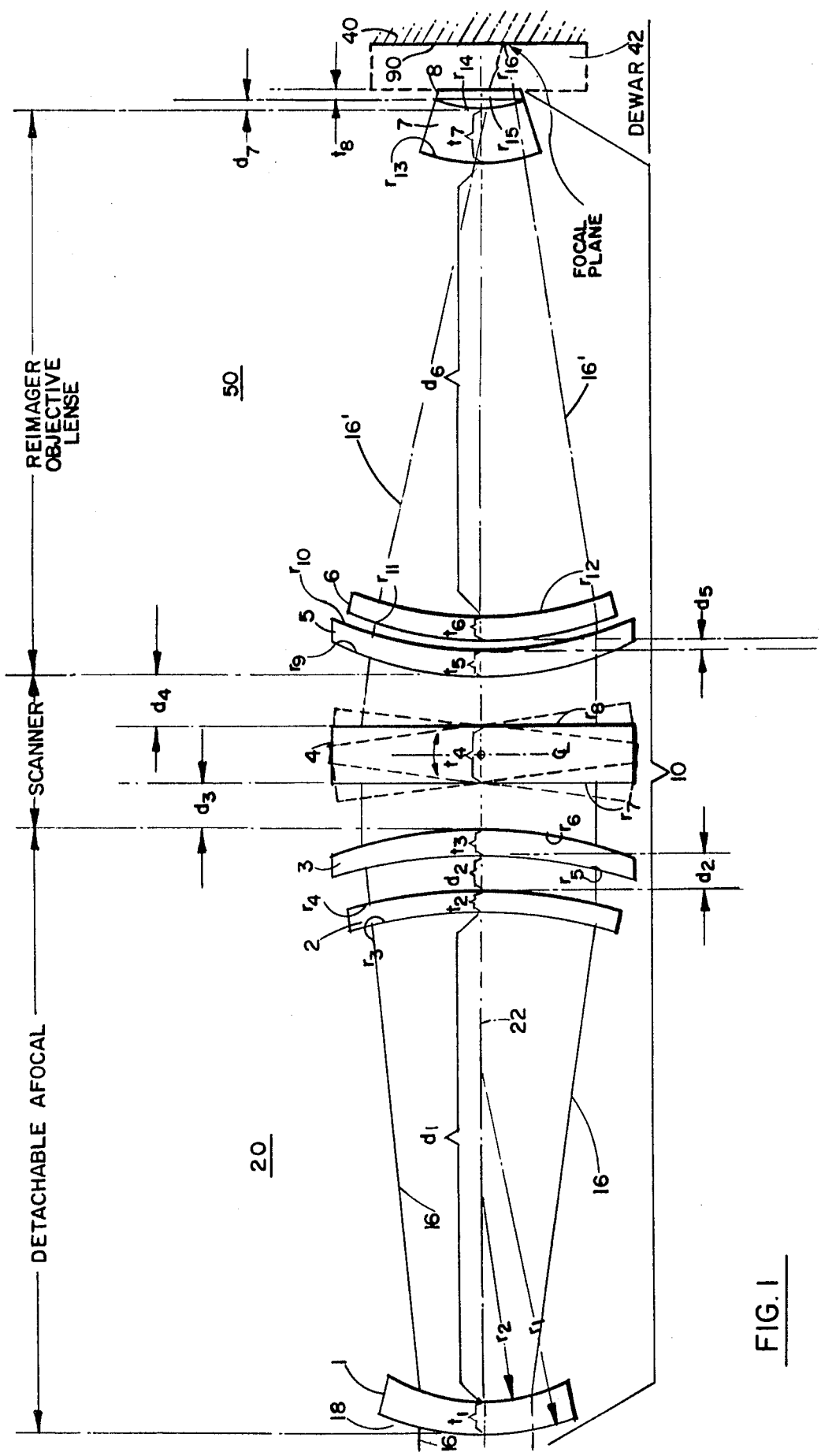
FIG. 1 is an exploded view of the invention selectable field-of-view infrared lens.

Now referring to FIG. 1 of the drawing, the selectable field-of-view infrared lens system 10 for projecting an image from object space onto a flat image plane 90 is depicted. The infrared lens system 10 is corrected over the spectral region of 3.3 to 4.2 microns and has a selectable wide field-of-view.

Objective lens system 50 is shown having a plurality of lens elements 5, 6, 7 and window 8 formed of material optically transparent of the spectral region of 3.3 to 4.2 microns. The lens elements each have a vertex and each is coaxially aligned on a chief ray 22 passing through each vertex. The objective lens system 50 is adapted to receive light from object space or from the selectable refractive Galilean afocal telescope 20 and to form an image on the flat image plane 90.

The selectable refractive Galilean afocal telescope 20 has a plurality of lens elements 1, 2, 3 of material optically transparent over the spectral region of 3.3 to 4.2 microns. Each of the lens elements has a vertex and is coaxially aligned on chief ray 22 passing through each vertex. The selectable refractive afocal telescope is coupled to the objective lens in select field-of-view determining relation with the objective lens system. Upon selection, the selectable refractive galilean afocal telescope 20 cooperates with the objective lens system 50 to provide a wide field-of-view.

The selectable refractive Galilean afocal telescope 20 dimensions $r_1$, $r_2$, $r_3$, $r_4$, $r_5$ and $r_6$ represent te spherical radius of curvature of the surface designated in FIG. 1. The dimensions $d_1$, $d_2$ and $d_3$ represent the distance between the vertices of the lens elements designated in FIG. 1. The dimensions $t_1$, $t_2$ and $t_3$ define the thickness of lens elements 1, 2 and 3 respectively. The dimensions characterizing the prescription for the lens elements comprising the selectable refractive galilean afocal telescope are defined by the following table:

TABLE I

| Lens Element | Radius of Curvature (inches) Front/Back | Thickness and Spacing (inches) | Aperture (inches) Front/Back | Material |
|---|---|---|---|---|
| 1 | $r_1 = +1.6210 \pm 0.001/$ $r_2 = +1.0141 \pm 0.001$ | $t_1 = 0.1250 \pm 0.002$ | 0.8475/ 0.730 | SI |
| | | $d_1 = 2.1980 \pm 0.004$ | | |
| 2 | $r_3 = -2.3364 \pm 0.001/$ $r_4 = -2.9299 \pm 0.0015$ | $t_2 = 0.1250 \pm 0.001$ | 1.2135/ 1.2750 | GE |
| | | $d_2 = 0.1816 \pm 0.002$ | | |
| 3 | $r_5 = -2.9768 \pm 0.0015$ $r_6 = -2.0206 \pm 0.001$ | $t_3 = 0.1250 \pm 0.001$ | 1.3594/ 1.3969 | SI |
| | | $d_3 = 0.2500$ | | |

Means for scanning (not shown), is included having optical element 4 with an optical center 30, the optical element 4 being interposed between and coaxially aligned with the selectable refractive Galilean afocal telescope 20 and the objective lens system. The means for scanning is adapted to oscillate the optical element 4 through a relatively small predetermined angle to deflect the collimated rays.

The optical element 4 is depicted in FIG. 1 as having dimensions $r_7$ and $r_8$ each being a radius of curvature of the surface designated in FIG. 1. Optical element 4 has a thickness designated by $t_4$. The front surface of optical element 4 having radius of curvature 7 is displaced from the back surface of optical element 3 by distance $d_3$ measured between the vertex of lens element 3 and te optical center 30 of lens element 4. The prescription for optical element 4 is:

TABLE II

| Lens Element | Radius of Curvature Front/Back | Thickness and Spacing (inches) | Aperture (inches) Front/Back | Material |
|---|---|---|---|---|
| 4 | $r_7 =$ INFINITE $r_8 =$ INFINITE | $d_3 = 0.2500$ | 1.3446 1.3405 | SI |

The material SI is silicon.

Upon selection, the selectable refractive Galilean afocal telescope receives collimated light rays 16 from object space and provides the collimated rays 16 to the means for scanning oscillating optical element 4. The collimated rays 16 pass through oscillating optical element 4 and are reciprocally displaced by the oscillating optical element 4 to form reciprocally displaced collimated rays 16'. The reciprocally displaced collimated rays 16' pass through the objective lens system 50. The objective lens system 50 focuses the reciprocally displaced collimated rays 16' on the flat image plane 90, thereby forming a reciprocally displaced image.

The infrared lens system 10 further comprises: means for decoupling (not shown) the refractive Galilean afocal telescope 20 from the objective lens 50. Typical means for decoupling the refractive Galilean afocal telescope 20 from the objective lens system 50, known in the art include bayonet, turret, and pivotal means about the centroid of the selectable refractive Galilean afocal telescope.

The objective lens system 50 comprises a fifth lens element having a front and back surface and a thickness, $t_5$. The fifth lens element front surface has a radius of curvature $r_9$. The fifth lens element back surface has a radius of curvature designated by $r_{10}$.

The sixth lens element has a front and back surface and a thickness $t_6$. The sixth lens element front surface has a radius of curvature designated by $r_{11}$. The sixth lens back surface has a radius of curvature designated by $r_{12}$.

The seventh lens element 7 has a front and back surface and a thickness $t_7$. The seventh lens element front surface has a radius of curvature designated by $r_{13}$. The seventh lens element back surface has a radius of curvature designated by $r_{14}$.

The dewar window 8 has a front surface and a back surface and a thickness $t_8$. The dewar window front surface has a radius of curvature designated by $r_{15}$. The dewar window has a back surface with a radius of curvature designated by $r_{16}$.

The fifth lens element front surface vertex is spaced from the means for scanning optical element back surface by distance $d_4$. The sixth lens element front surface vertex is spaced from the fifth lens element back surface vertex by distance $d_5$. The seventh lens element front surface vertex is spaced from the sixth lens element back surface vertex by distance $d_6$. The dewar window optical center is spaced from the seventh lens element back surface vertex by distance $d_7$. The flat image plane is spaced from the dewar window back surface by distance $d_8$.

The objective lens system dimensions $r_9$, $r_{10}$, $r_{11}$, $r_{12}$, $r_{13}$, $r_{14}$, $r_{15}$, $d_4$, $d_5$, $d_7$, $d_8$, $t_5$, $t_6$, $t_7$ and $t_8$ are defined by the following table:

TABLE III

| Lens Element | Radius of Curvature (inches) Front/Back | Thickness and Spacing (inches) | Aperture (inches) Front/Back | Material |
|---|---|---|---|---|
| 5 | $r_9 = +2.4211 \pm 0.001/$ $r_{10} = +5.6848 \pm 0.001$ | $t_5 = 0.1182 \pm 0.002$ | 1.3307/ 1.3069 | SI |
| | | $d_5 = 0.0125 \pm 0.004$ | | |

TABLE III-continued

| Lens Element | Radius of Curvature (inches) Front/Back | Thickness and Spacing (inches) | Aperture (inches) Front/Back | Material |
| --- | --- | --- | --- | --- |
| 6 | $r_{11} = +8.7545 \pm 0.001/$<br>$r_{12} = +5.0678 \pm 0.0015$ | $t_6 = 0.1500 \pm 0.001$ | 1.3074/<br>1.2588 | GE |
|  |  | $d_6 = 1.9515 \pm 0.002$ |  |  |
| 8 | $r_{13} = +0.9334 \pm 0.0015$<br>$r_{14} = +0.9742 \pm 0.001$ | $t_7 = 0.2500 \pm 0.001$ | 0.5495/<br>0.4244 | SI |
|  |  | $d_7 = 0.0231$ |  |  |
|  | $r_{15} = $ INFINITE | $t_8 = 0.0400$ |  | SA |
|  | $r_{16} = $ INFINITE | $d_8 = 0.2000$ |  |  | given the equivalent focal length, f, of said objective lens system as being 1.804±0.01 inches, SI being Silicon, GE being Germanium and SA being Sapphire.

The invention means for selectably coupling and decoupling the refractive Galilean afocal telescope 20 from the objective lens system is intended to include all methods for selectably positioning the refractive Galilean afocal telescope 20 free of the objective lens 50 whereby the objective lens 50 obtains an unobstructed view of object space 18, thereby providing a narrow angle field-of-view.

As defined in the *Handbook of Military Infrared Technology* by William L. Wolfe, the University of Michigan, 1965, page 422, "An afocal system has its object and image at infinity and thus has no focal length. It is composed of two or more components so arranged that (in a two-component system) the image of the first component, which is the object of the second, lies exactly at the first focal point of the second component and is thus re-imaged at infinity." The refractive Galilean afocal telescope 20 provides reduction and is designed to avoid reverting or inverting the image viewed by the first lens element 1. The image projected onto the flat detector surface 90 retains its orientation with respect to image space with a wide or narrow angle field-of-view selected. The design of the refractive Galilean afocal telescope 20 coupled to objective lens system 50 for projecting an image onto the flat detector 90 within a cryogenically cooled body 40 in a dewar 42 having a dewar window 8, is specifically adapted to avoid reverting and inverting the image when the telescope is used for wide angle viewing. The design also eliminates the added complexity of apparatus, such as additional lens elements or such as additional electronic processing of image data derived from signals provided by detectors (not shown) mounted on flat image plane 90 in response to the image projected onto flat image plane 90. The reduction provided by refractive Galilean afocal telescope 20 is 0.32.

The design parameters for the infrared lens system appearing in Tables I, II and III follow from initial infrared lens specifications and successful ray tracing approximations which, when applied, provide optimum ranges outside of which the lens system would become unacceptable in view of the stated specification. The specification required that the invention selectable field-of-view infrared lens provide a wide field-of-view measuring 12.5 degrees from top to bottom and 25.0 degrees from side to side with a reduction power of 0.32 and a narrow field-of-view measuring 4.0 degrees from top to bottom and 8.0 degrees from side to side.

The design permits selection of the narrow field-of-view by removing the refractive Galilean afocal telescope 20 to expose means for scanning optical element 4 to object space 18. The wide field-of-view is obtained by positioning the refractive Galilean afocal telescope 20 in front of the means for scanning optical element 4.

There is thus provided a selectable field-of-view infrared lens having axially aligned optical elements of silicon and germanium. In the preferred embodiment of the invention objective lens system 50 defined by Table III, the equivalent focal length f' is 1.804±0.01 inches. Selecting the selectable refractive Galilean afocal telescope 20 decreases the equivalent focal length f' to 0.576 inches. The wavelength region for the design of the preferred embodiment invention lens is 3.3 to 4.2 microns.

The description provided is intended to be illustrative only and is not intended to be limitive. Those skilled in the art may conceive of modifications to the FIG. 1 disclosed. However, any such modification which fall within the purview of the description are intended to be included therein as well. The scope of this invention shall be determined from the scope of the following claims including their equivalents.

What is claimed is:

1. A selectable field-of-view infrared lens for projecting an image from object space onto a flat image plane, said selectable field-of-view infrared lens being corrected over the spectral region of 3.3 to 4.2 microns and having a selectable wide field-of-view comprising:

an objective lens system having a plurality of lens elements formed of material optically transparent over the spectral region of 3.3 to 4.2 microns, said plurality of lens elements each having a vertex and being coaxially aligned on a chief ray passing through each vertex and adapted to receive light from object space and to form an image on said flat image plane, a selectable refractive Galilean afocal telescope having a plurality of lens elements formed of material optically transparent over the spectral region of 3.3 to 4.2 microns said plurality of lens elements having a vertex and being coaxially aligned on a chief ray passing through each vertex, said selectable refractive afocal telescope being coupled to said objective lens, said selectable refractive Galilean afocal telescope being in select field-of-view determining relation with said objective lens system; upon selection, said selectable refractive Galilean afocal telescope cooperates with said objective lens system to provide a wide field-of-view, a means for scanning, said means for scanning having an optical element having an optical center, said optical element being interposed between and coaxially aligned with said selectable refractive Galilean afocal telescope and said objective lens system, said means for scanning being adapted to oscillate said optical element through a predetermined angle, angularly displacing said collimated rays;

whereby, upon selection, said selectable refractive Galilean afocal telescope receives collimated light from object space and provides said collimated rays to said means for scanning optical element, said collimated rays passing through said oscillating optical element and being reciprocally displaced, said reciprocally displaced collimated rays passing to said objective lens system, said objective lens system focusing said reciprocally displaced collimated rays on said flat image plane; thereby, forming a reciprocally displaced image.

2. The combination of claim 1, further comprising:

means for selectably coupling and decoupling said refractive Galilean afocal telescope from said objective lens system;

whereby, collimated light from object space passes through said scanning oscillating optical element to said objective lens system, said objective lens system focusing said light from object space to form a reciprocally displaced image on said flat image plane.

3. The combination of claim 2, wherein said means for scanning oscillating optical element further comprises:

a front surface having a radius $r_7$, a thickness $t_4$ and a pack surface having a radius $r_8$, said means for scanning oscillating optical element optical center being spaced from said selectable refractive Galilean afocal telescope third lens back surface vertex by a distance $d_3$, said refractive Galilean afocal telescope chief ray being aligned to pass through the optical center of said means for scanning optical element, and being coaxially aligned with said objective lens system chief ray.

4. The combination of claim 3, wherein said means for scanning optical element is defined by the following table:

TABLE II

| Lens Element | Radius of Curvature Front/Back | Thickness and Spacing (inches) | Aperture (inches) Front/Back | Material |
|---|---|---|---|---|
| 4 | $r_7$ = INFINITE | $d_3$ = 0.2500 | 1.3446 | SI |
|   | $r_8$ = INFINITE |   | 1.3405 |   |

SI being Silicon.

5. The combination of claim 3, wherein said objective lens system further comprises:

a fifth lens element having a front and back surface and a thickness, $t_5$, said fifth lens element front surface having a radius of curvature $r_9$, said fifth lens element back surface having a radius of curvature $r_{10}$, a sixth lens element having a front and back surface and a thickness $t_6$, said sixth lens element front surface having a radius of curvature $r_{11}$, said sixth lens back surface having a radius of curvature $r_{12}$, a seventh lens element having a front and back surface and a thickness $t_7$, said seventh lens element front surface having a radius of curvature $r_{13}$, said seventh lens element back surface having a radius of curvature $r_{14}$, a dewar window, said dewar window having a front surface and a back surface and a thickness $t_8$, said dewar window front surface having a radius of curvature $r_{15}$, said dewar window back surface having a radius of curvature $r_{16}$, said fifth lens element front surface vertex being spaced from said means for scanning oscillating optical element back surface by distance $d_4$, said sixth lens element front surface vertex being spaced from said fifth lens element back surface vertex by distance $d_5$, said seventh lens element front surface vertex being spaced from said sixth lens element back surface vertex by istance $d_6$, said dewar window optical center being spaced from said seventh lens element back surface vertex by distance $d_7$, said flat image plane being spaced from said dewar window back surface by distance $d_8$.

6. The combination of claim 5, wherein said objective lens system dimensions $r_9$, $r_{10}$, $r_{11}$, $r_{12}$, $r_{13}$, $r_{14}$, $r_{15}$, $d_4$, $d_5$, $d_6$, $d_7$, $d_8$, $t_5$, $t_6$, $t_7$ and $t_8$ are defined by the following table:

TABLE III

| Lens Element | Radius of Curvature (inches) Front/Back | Thickness and Spacing (inches) | Aperture (inches) Front/Back | Material |
|---|---|---|---|---|
| 1 | $r_9$ = +2.4211 ± 0.001/ $r_{10}$ = +5.6848 ± 0.001 | $t_5$ = 0.1182 ± 0.002 | 1.3307/ 1.3069 | SI |
|   |   | $d_5$ = 0.0125 ± 0.004 |   |   |
| 2 | $r_{11}$ = +8.7545 ± 0.001/ $r_{12}$ = +5.0678 ± 0.0015 | $t_6$ = 0.1500 ± 0.001 | 1.3074/ 1.2588 | GE |
|   |   | $d_6$ = 1.9515 ± 0.002 |   |   |
| 3 | $r_{13}$ = +0.9334 ± 0.0015 $r_{14}$ = +0.9742 ± 0.001 | $t_7$ = 0.2500 ± 0.001 | 0.5495/ 0.4244 | SI |
|   |   | $d_7$ = 0.0231 |   |   |
|   | $r_{15}$ = INFINITE $r_{16}$ = INFINITE | $t_8$ = 0.0400 $d_8$ = 0.2000 |   | SA | given the equivalent focal length, f, of said objective lens system as being 1.804±0.01 inches, SI being Silicon, GE being Germanium and SA being Sapphire.

7. The combination of claim 1, wherein said selectable refractive Galilean afocal telescope further comprises:

a first lens, a second lens, a third lens;

each respective lens having a front and back surface, each respective surface having a respective radius of curvature, said selectable refractive Galilean afocal telescope first lens front surface having a radius $r_1$, a thickness $t_1$ and a back surface having a radius $r_2$, said selectable refractive Galilean afocal telescope second lens having a front surface having a radius $r_3$, a thickness $t_2$ and a back surface having a radius $r_4$, said selectable refractive Galilean afocal telescope first lens back surface and second lens front surface being separated by a distance $d_1$, said selectable refractive Galilean afocal telescope third lens having a front surface having a radius $r_5$, thickness $t_3$ and a back surface having a radius $r_6$, said second lens back surface and third lens front surface being separated by distance $d_2$.

8. The combination of claim 7, wherein said selectable refractive Galilean afocal telescope dimensions $r_1$, $r_2$, $r_3$, $r_4$, $r_5$, $r_6$, $d_1$, $d_2$, $t_1$, $t_2$, $t_3$ are defined by the following table:

TABLE I

| Lens Element | Radius of Curvature (inches) Front/Back | Thickness and Spacing (inches) | Aperture (inches) Front/Back | Material |
|---|---|---|---|---|
| 1 | $r_1 = +1.6210 \pm 0.001$ / $r_2 = +1.0141 \pm 0.001$ | $t_1 = 0.1250 \pm 0.002$ | 0.8475/ 0.730 | SI |
| 2 | $r_3 = -2.3364 \pm 0.001$ / $r_4 = -2.9299 \pm 0.0015$ | $d_1 = 2.1980 \pm 0.004$ $t_2 = 0.1250 \pm 0.001$ | 1.2135/ 1.2750 | GE |
| 3 | $r_5 = -2.9768 \pm 0.0015$ $r_6 = -2.0206 \pm 0.001$ | $d_2 = 0.1816 \pm 0.002$ $t_3 = 0.1250 \pm 0.001$ | 1.3594/ 1.3969 | SI | given the equivalent focal length, f, of said selectable refractive Galilean afocal telescope as being infinite, SI being Silicon and GE being Germanium.

* * * * *